United States Patent Office.

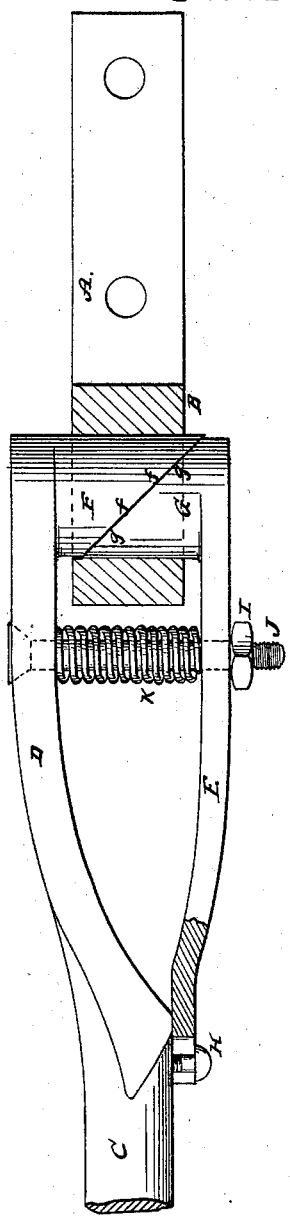

WILLIAM J. KEENEY, OF FLORENCE, INDIANA.

Letters Patent No. 70,224, dated October 29, 1867.

IMPROVEMENT IN PITMAN-COUPLING.

The Schedule referred to in these Letters Patent and making part of the same.

TO WHOM IT MAY CONCERN:

Be it known that I, WILLIAM J. KEENEY, of Florence, Switzerland county, Indiana, have invented a new and useful Pitman-Coupling; and I hereby declare the following to be a full, clear, and exact description thereof, reference being had to the accompanying drawing, making part of this specification.

This invention relates to an improvement in pitman-joints or couplings, to enable the correction of the looseness and rattle incident to wear.

A may represent a portion of a harvester cutter-bar, or any other object to which a pitman is to be attached, the same having a cylindrical eye, B. C is a portion of a pitman, having one fast jaw D, and one adjustable jaw E, which jaws have correspondingly cylindrical studs F G, having oblique terminations $f$ $g$, which, meeting together, the two studs form collectively a cylindrical wrist, F G. The jaw E may be secured to the jaw D by means of a screw, H. The jaws are pressed together by a nut, I, upon a screw-threaded bolt, J, which traverses both jaws, and are held firmly to any definite approximation by a spiral spring, K. Any ovaling wear of the eye B and wrist F G may be quickly and perfectly corrected by a slight turn of the nut I, so as to cause the studs F and G to slide along each other. I reserve the right to modify the details of this improvement, so long as the same result is obtained by means substantially equivalent; for example, a wedge or key may be used instead of the nut I and screw J, and the jaws themselves being made to spring apart, a special spring, K, for that purpose would become unnecessary.

I claim herein as new, and of my invention—

1. The wrist F G, composed of two cylindrical studs with correspondingly oblique terminations, when formed to be approximated or withdrawn in the line of their axis, substantially as set forth.

2. The arrangement of jaws D E, having the obliquely terminated cylindrical studs F G, and compressing and expanding devices I J K, or their mechanical equivalents, substantially as and for the purpose set forth.

In testimony of which invention I hereunto set my hand.

WM. J. KEENEY.

Witnesses:
GEO. H. KNIGHT,
FRANK MILLWARD.